(12) United States Patent
Onoda et al.

(10) Patent No.: US 7,180,020 B2
(45) Date of Patent: Feb. 20, 2007

(54) STEERING COLUMN MODULE

(75) Inventors: Yoshimichi Onoda, Toyota (JP);
Masami Sakamoto, Toyota (JP);
Masaharu Hayashi, Toyota (JP);
Masahiro Takamatsu, Toyota (JP);
Humio Inoue, Toyota (JP); Masahide Nagata, Shimada (JP); Kouichi Takao, Shimada (JP); Shigeki Mori, Toyota (JP); Kenichirou Komizo, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/492,637

(22) PCT Filed: Nov. 8, 2002

(86) PCT No.: PCT/JP02/11692

§ 371 (c)(1),
(2), (4) Date: Apr. 14, 2004

(87) PCT Pub. No.: WO03/047943

PCT Pub. Date: Jun. 12, 2003

(65) Prior Publication Data

US 2005/0028635 A1 Feb. 10, 2005

(30) Foreign Application Priority Data

Nov. 12, 2001 (JP) .............................. 2001-346050

(51) Int. Cl.
*H01H 9/00* (2006.01)

(52) U.S. Cl. .................................. 200/61.54; 200/61.27

(58) Field of Classification Search .. 200/61.54–61.57, 200/1 R, 5 R, 51.02–51.06, 293, 295; 439/76.1, 439/206, 519, 521, 620
See application file for complete search history.

(56) References Cited

U.S. PATENT DOCUMENTS

| | | | | |
|---|---|---|---|---|
| 5,070,323 A | * | 12/1991 | Iino et al. | 340/980 |
| 5,204,667 A | * | 4/1993 | Inoue | 340/980 |
| 5,502,615 A | * | 3/1996 | Kubota et al. | 361/647 |
| 5,703,612 A | * | 12/1997 | Salmon et al. | 340/815.78 |
| 5,952,729 A | * | 9/1999 | Shiratori et al. | 307/9.1 |
| 6,236,004 B1 | * | 5/2001 | Stadler et al. | 200/61.28 |
| 6,249,744 B1 | * | 6/2001 | Morita | 701/213 |
| 6,344,621 B1 | * | 2/2002 | Shiratori et al. | 200/61.54 |
| 6,592,142 B2 | * | 7/2003 | Landen et al. | 280/728.2 |
| 6,776,634 B2 | * | 8/2004 | Besier et al. | 439/164 |

FOREIGN PATENT DOCUMENTS

| | | |
|---|---|---|
| DE | 872 168 C | 3/1953 |
| DE | 195 24 153 A | 1/1997 |
| DE | 100 33 050 A | 1/2002 |
| FR | 2 623 776 A | 6/1989 |
| WO | WO 00 37277 A | 6/2000 |

* cited by examiner

*Primary Examiner*—Elvin Enad
*Assistant Examiner*—M. Fishman
(74) *Attorney, Agent, or Firm*—Sughrue Mion, PLLC

(57) ABSTRACT

A steering column cover body accommodates therein at least one of an electric junction block, a meter and at least one switch which are directly connected with each other. The switch includes at least one of a turn switch, a wiper switch, a hazard switch and an ignition switch. The meter includes a circuit board on which a first circuit for driving the meter and a second circuit for driving the at least one switch is mounted.

6 Claims, 9 Drawing Sheets

STEERING COLUMN MODULE

TECHNICAL FIELD

This invention relates to a steering column module in which parts around an automotive steering column are combined together into a unitary construction.

BACKGROUND ART

Heretofore, in many cases, various meters and a junction block of an automobile have been mounted in an instrument panel, and have been located in different positions, respectively, and these parts, as well as a turn switch and a wiper switch, mounted on a column, and other switches, mounted on the instrument panel, have been individually connected to their mating parts at an assembling line.

For example, as shown in FIG. 12, there is provided a wire harness 29 interconnecting a meter 8 and a junction block 5, and there is provided a wire harness 30 connecting a turn switch 6 and a wiper switch 7 to the junction block 5 or the meter 8.

As another example shown in FIG. 13, although an engine room-side wire harness 15 is connected directly as a wire harness 17 to a junction block 5 through a grommet 16, it is connected to the meter 8 via a connector 31 and an instrument panel-side wire harness 32. In such a configuration, it is difficult to connect the engine room-side wire harness directly to the meter mounted in the instrument panel.

As still another example shown in FIG. 14, there are provided a wire harness 27 and fuses 28 connected between an ignition switch 13 and a junction block 5. A thick wire 26 is used in order to supply a large current to the ignition switch 13 from an on-vehicle battery (not shown) via a wire harness 23 and a wire 25 within the junction block 5. Further, in order to protect the circuit because of the provision of the wire harness 27, a fusible link 24 is provided within the junction block 5.

The number of the parts, mounted around the column in the assembling process in the production of the vehicle, is about 8, that is, a combination meter, a junction block, a turn switch, a wiper switch, a hazard switch, a meter cluster, a lower column cover and an upper column cover.

Therefore, the number of the mounting operations in the production of a vehicle increased, and the fixing structure is limited to the type which enabled the mounting operation to be carried out only from a predetermined direction of the assembling line. Therefore, the operation for exchanging the meters, the junction block and so on, as well as the disassembling operation, are not efficient.

DISCLOSURE OF THE INVENTION

It is therefore an object of this invention to provide a steering column module in which the efficiency of an assembling operation around a steering column of a vehicle and the efficiency of an exchanging operation are improved, and besides the number of parts to be mounted, as well as the number of wire harnesses, can be reduced.

In order to achieve the above object, according to the present invention, there is provided a steering column module for a vehicle, comprising a cover body, which accommodates therein at least one of an electric junction block and a meter.

In this modularized configuration, the efficiency of the mounting operation at a vehicle assembling line is enhanced. And besides, the parts around a steering handle need to be firmly fixed without being affected by the direction of the operation at the vehicle assembling line. Further, the efficiency of the operation for exchanging these parts, as well as the efficiency of the dissembling operation, can be enhanced. In addition, in the disassembling operation, the meter and the electric junction block can be easily removed as a set at one time, and the recycling ability is enhanced.

Preferably, the meter is directly connected to the electric junction block.

In this configuration, the number of wire harnesses is much reduced as a result of direct connection between the parts, and the number of connections is reduced, so that the reliability is enhanced.

Preferably, the steering column module further comprises at least one switch.

In this configuration, the efficiency of mounting of the parts on the vehicle, the efficiency of the exchanging operation and the recycling ability are further enhanced.

Here, it is preferable that the at least one switch includes at least one of a turn switch, a wiper switch, a hazard switch and an ignition switch.

In this configuration, a wider choice can be obtained to firmly fix the switches.

Further, it is preferable that the meter includes a circuit board on which a first circuit for driving the meter and a second circuit for driving the at least one switch is mounted.

In this configuration, the meter board can serve also as the circuit board for another function, and since the use of a separate extended-function circuit board and its associated wire harness can be omitted, the cost can be reduced. The meter circuit can serve also to perform part of the functions of the extended-function circuit, and by doing so, the number of the circuits and the number of the electronic parts are reduced, so that the cost can be reduced.

Further, it is preferable that the at least one switch is directly connected to at least one of the junction box and the meter.

In this configuration, the number of the wire harnesses is greatly reduced, and the number of connections is reduced, so that the reliability is enhanced.

Here, it is preferable that the steering column module further comprises a meter cluster accommodated in the cover body. At least one of the electric junction block, the meter and the at least one switch is accommodated in the meter cluster to form a meter module.

In this configuration, many parts, heretofore mounted in the vehicle assembling process, are combined together into the unitary construction, and these parts can be mounted at one time in the vehicle assembling process. And besides, the number of the parts to be mounted around the steering column is reduced, and therefore the time and labor, required for the mounting operation, are reduced, so that the cost is reduced.

Preferably, the meter is directly connected to an engine room-side wire harness.

In this configuration, the use of an instrument panel-side wire harness, including a connector for connecting the engine room-side wire harness, is not necessary, and the number of the wire harnesses can be reduced. Since the use of this connector is not necessary, the number of connections between the parts is reduced, so that the reliability is enhanced.

Preferably, the meter is a combination meter.

In this configuration, the efficiency of mounting of the combination meter, as well as the exchanging operation, can be enhanced.

BRIEF DESCRIPTION OF THE DRAWINGS

In the accompanying drawings

BEST MODE FOR CARRYING OUT THE INVENTION

Figure 1:
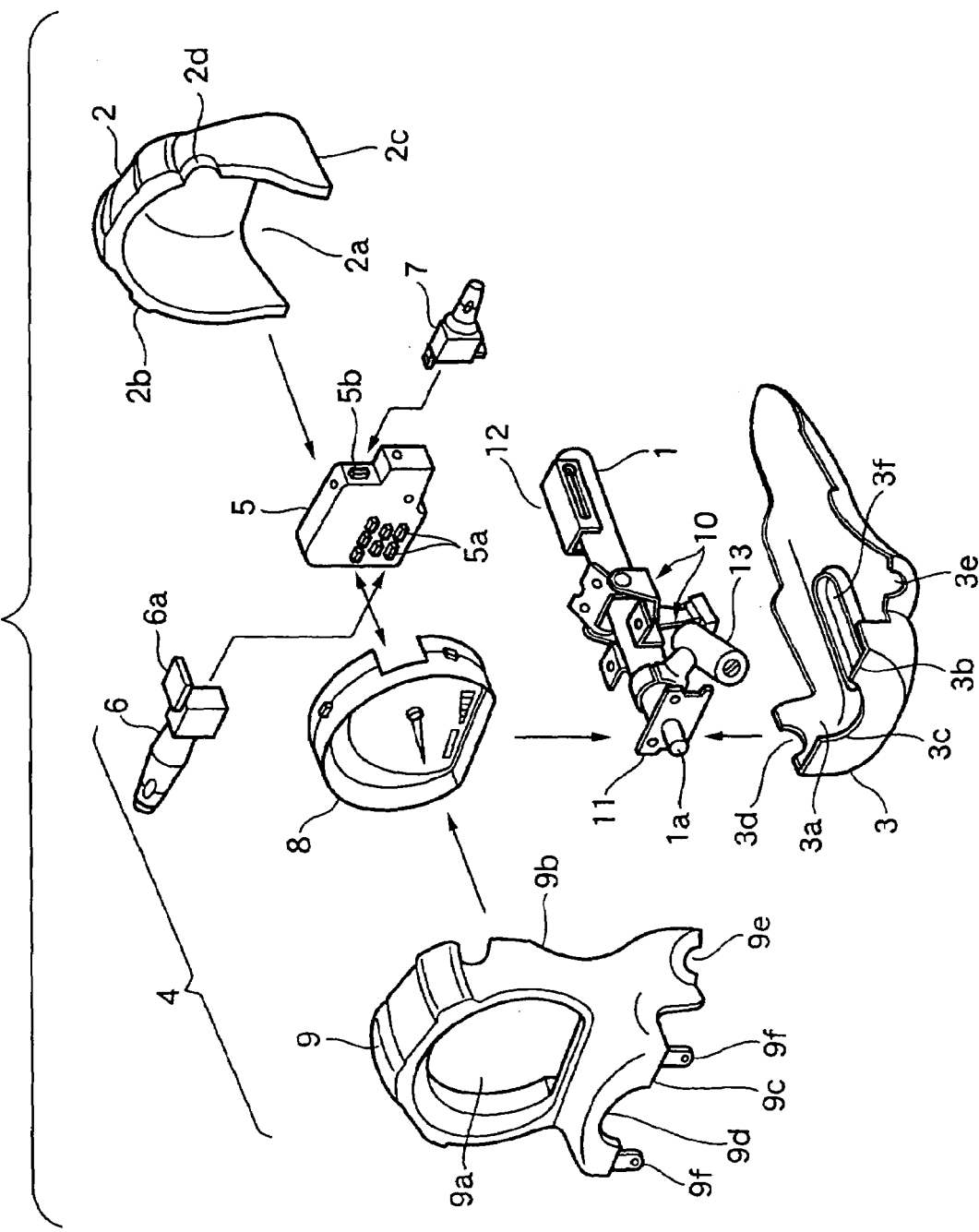
FIG. 1 is an exploded, perspective view of a steering column module according to a first embodiment of the invention.

Preferred embodiments of the invention will now be described with reference to the accompanying drawings. In the drawings, identical constituent elements will be designated by identical reference numerals, respectively.

As shown in FIG. 1, a steering column module according to a first embodiment comprises a steering column cover, composed of an upper column cover 2 and a lower column cover 3, and a meter module 4, and this steering column module is mounted on a steering post 1. A steering shaft 1a, on which a steering wheel 14 is mounted, is passed through the steering post 1, and brackets 10, a mounting plate 11 and an ignition switch 13 are fixedly secured to the steering post 1.

The upper column cover 2 has a receiving recess 2a formed by a side edge portion 2b and a lower edge portion 2c, and a notch 2d, through which a wiper switch 7 is passed when this module is assembled, is formed in the side edge portion 2b.

The lower column cover 3 has a receiving recess 3a formed by an outer edge portion 3b, and notches 3c, 3d and 3e, through which the steering shaft 1a, a turn switch 6 and the ignition switch 13 are respectively passed when this module is assembled, are formed in the outer edge portion 3b, and the lower column cover 3 has an opening 3f through which the brackets 10 are passed.

The meter module 4 includes a junction block 5, the turn switch 6, the wiper switch 7, a meter 8, and a meter cluster 9.

The junction block 5 includes connectors 5a for direct connection to the meter 8, a connector 5b for direct connection to the wiper switch, and a connector (disposed at such a position that it is not seen in FIG. 1) for direct connection to a connector 6a of the turn switch 6.

The meter 8 may take the form of a single meter (such as a speedometer of an automobile) or the form of a combination meter including a speedometer, a tachometer and so on. Here, the meter 8 is the single speedometer.

The meter cluster 9 has a receiving recess 9a (in which the meter 8 is received) formed by a side edge portion 9b, and notches 9d and 9e, through which the steering shaft 1a and the ignition switch 13 are respectively passed when this module is assembled, are formed in a lower edge portion 9c, while mounting portions 9f are formed on the lower edge portion 9c.

Figure 2:
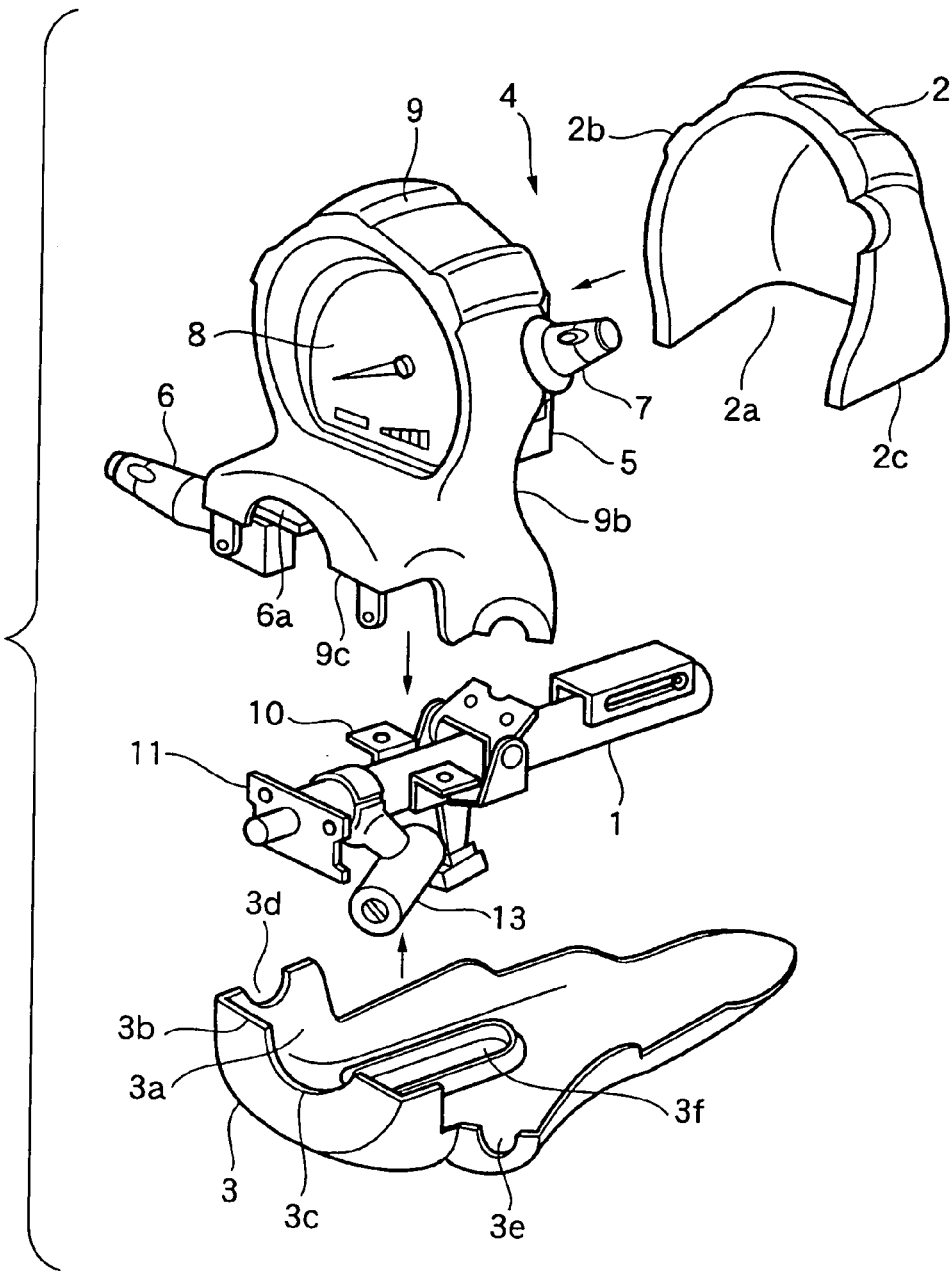
FIG. 2 is an exploded, perspective view of the steering column module which is in the process of being assembled.

For assembling the module, first, the meter module 4 is assembled as shown in FIG. 2. The meter 8 is fitted into the receiving recess 9a in the meter cluster 9. Then, the wiper switch 7 is directly connected to the connector 5b of the junction block 5, and the connector 6a of the turn switch 6 is directly connected to the connector (not shown) of the junction block 5. Then, the meter 8, fitted in the receiving recess 9a, is directly connected to the connectors 5a of the junction block 5, thus completing the meter module 4.

The completed meter module 4 is fixedly secured to the brackets 10 and the mounting plate 11 on the steering post 1. Then, the side edge portion 9b of the meter cluster 9 and the side edge portion 2b of the upper column cover 2 are coupled together. In this coupling method, for example, engagement grooves are formed in one of the side edge portion 9a and the side edge portion 2b while engagement claws are formed at the other although not shown in the drawings, and the engagement claws are engaged in the engagement grooves, respectively.

Then, the outer edge portion 3b of the lower column cover 3 is coupled to the lower edge portion 9c of the meter cluster 9 and the lower edge portion 2c of the upper column cover 2. In this case, engagement grooves are formed in one of the edge portions while engagement claws are formed at the other, and the engagement claws are engaged in the engagement grooves, respectively, as well as the above case. Alternatively, this engagement and the screw-fastening are used in combination.

Figure 3:
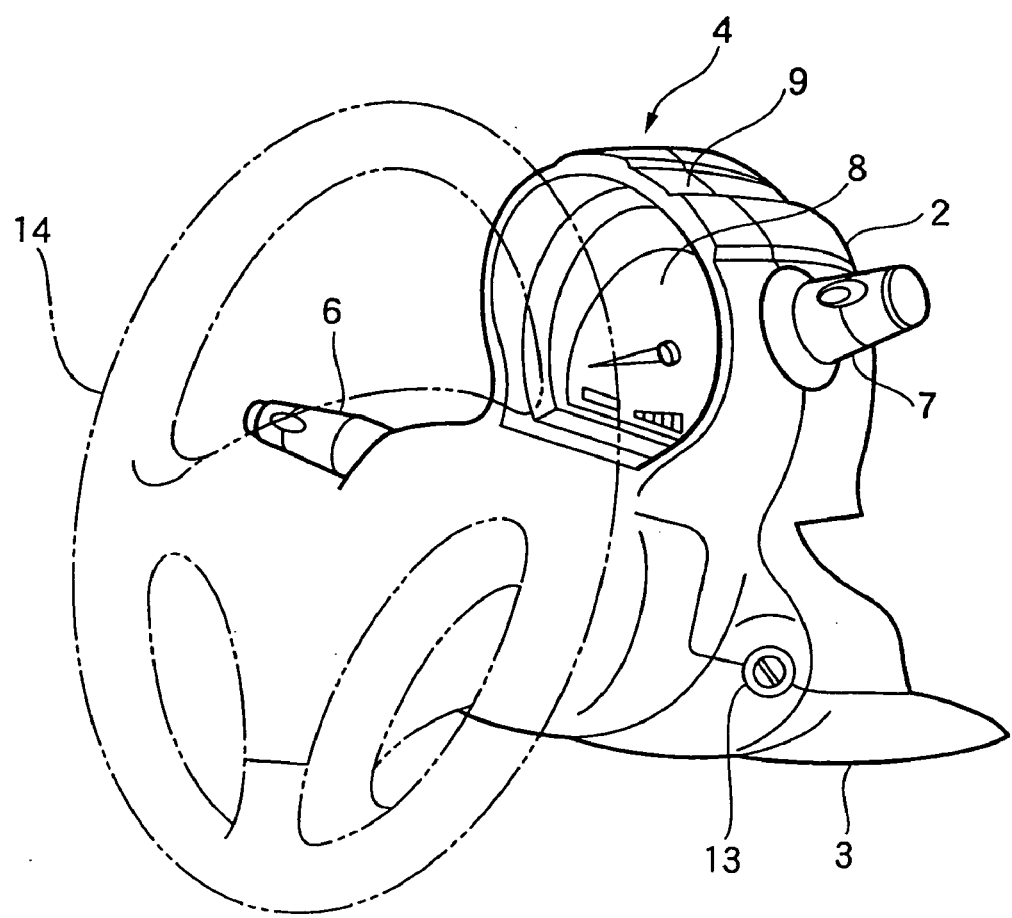
FIG. 3 is a perspective view of the steering column module in an assembled condition.

The thus completed steering column module, comprising the upper column cover 2, the lower column cover 3 and the meter module 4, is mounted on the steering post 1 as shown in FIG. 3. The meter 8, mounted on the column, can be viewed through the steering wheel 14.

Figure 4:
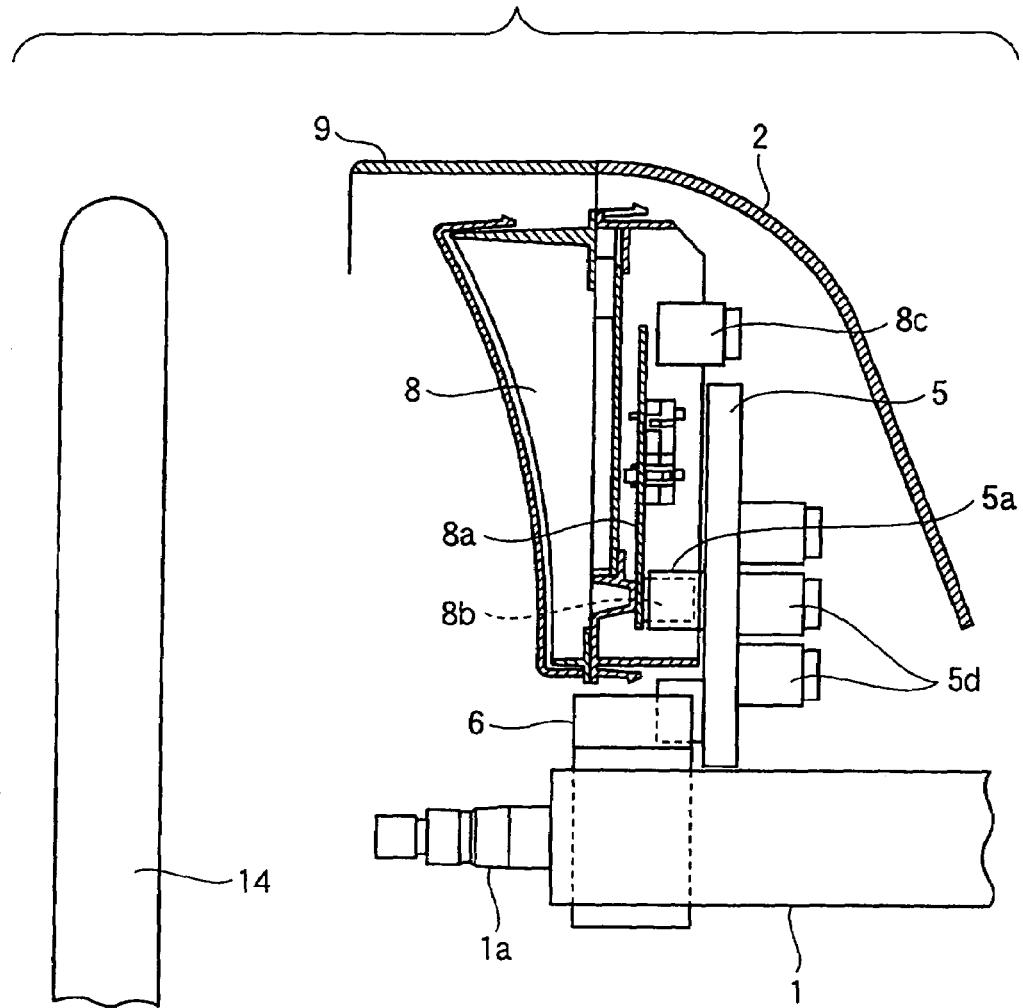
FIG. 4 is a partly-cross-sectional view showing a condition of connection between a meter and a junction block.

As shown in FIG. 4, the meter 8 includes a meter board 8a, and the connectors 5a of the junction block 5 are connected to connectors 8b, provided on one side of the meter board 8a, so that the meter 8 and the junction block 5 are electrically and mechanically connected together. Connectors 5d for connection to a wire harness from the exterior of the steering column module are provided on that face of the junction block 5 facing away from the connectors 5a.

Thus, the parts, provided in the steering column, that is, the meter module 4, including the switches 6, 7 and the meter 8, the junction block 5 and the steering post 1, can be incorporated into the steering column in a modularized manner.

Accordingly, the efficiency of the mounting operation at the vehicle-assembling line is enhanced. And besides, the parts around the steering handle need to be firmly fixed since these parts are liable to be affected by vibrations and the like, and because of the modularized construction, the way of firmly-fixing can be freely selected without being affected by the direction of the operation at vehicle-assembling the line.

And besides, since the meter 8 and the junction block 5 are provided on the column, the efficiency of the operation for exchanging these parts, as well as the efficiency of the dissembling operation, can be enhanced. Namely, in the related-art construction, for exchanging the meter 8 or the junction block 5, it is necessary to remove the instrument panel at least partly. On the other hand, in this embodiment, the exchanging operation can be easily carried out merely by removing the steering column cover. In addition, in the disassembling operation, the meter 8 and the junction block 5 can be easily removed as a set at one time, and the recycling ability is enhanced.

Among those parts heretofore mounted in the vehicle assembling process, the meter 8, the junction block 5, the turn switch 6, the wiper switch 7, the meter cluster 9 and so on are modularized, and by doing so, many parts, heretofore mounted in the vehicle assembling process, are combined together into the unitary construction, and these parts can be mounted at one time in the vehicle assembling process. And besides, since the number of the parts to be mounted around the steering column is three, that is, the upper column cover, the lower column cover and the meter module, the time and labor, required for the mounting operation, are reduced as compared with the related-art construction, so that the cost is reduced.

Figure 5:
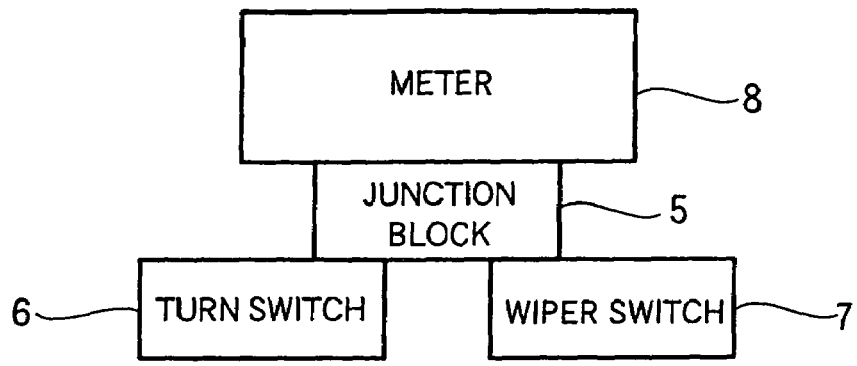
FIG. 5 is a diagram explanatory of conditions of direct connection of the meter, the junction block and switches.
Figure 12:
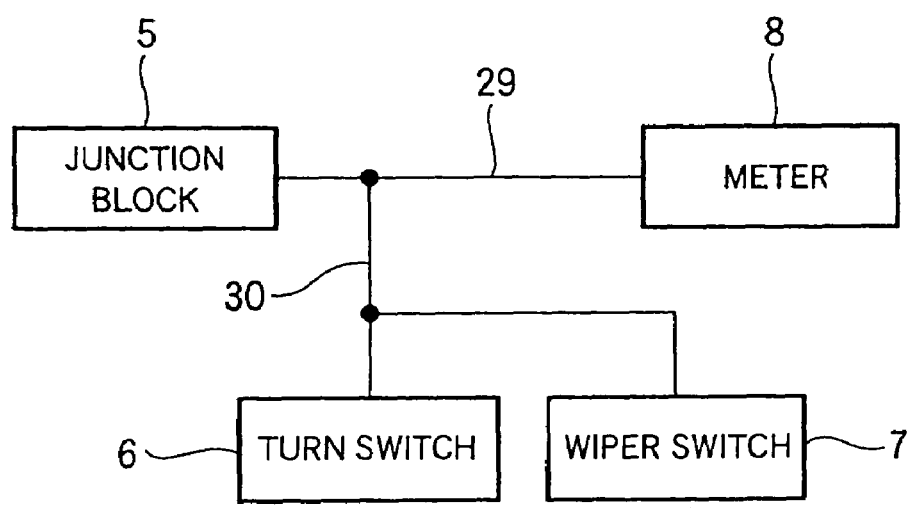
FIG. 12 is a diagram explanatory of a condition of connection between a junction block, a meter and switches in a first related-art construction.

Furthermore, since the meter 8, the turn switch 6 and the wiper switch 7 are connected directly to the junction block 5 as shown in FIG. 5, the use of such wire harnesses required for the construction as shown in FIG. 12 is omitted, so that the cost of the wire harnesses is greatly reduced. And besides, the number of connections between the parts is reduced as compared with the related-art construction, so that the reliability is enhanced.

Figure 6:
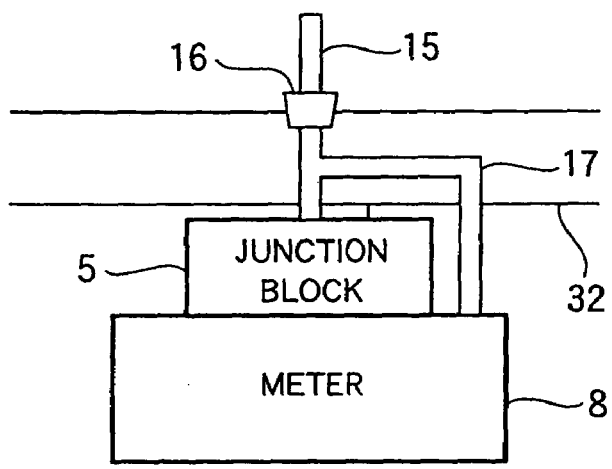
FIG. 6 is a diagram explanatory of a condition in which an engine room-side wire harness is connected directly to the meter.
Figure 13:
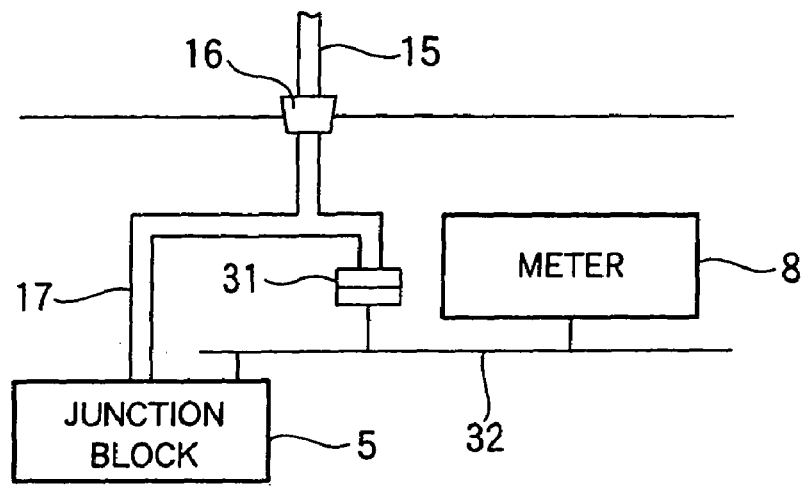
FIG. 13 is a diagram explanatory of a condition in which an engine room-side wire harness is connected to the meter in a second related-art construction.

In the construction in which the meter 8 is provided in the instrument panel as shown in FIG. 13, only the instrument panel-side wire harness 32 could be connected to the meter 8, and the engine room-side wire harness 15 is connected to the meter 8 via the instrument panel-side wire harness 32. In this embodiment, however, an engine room-side wire harness 15, passing through a grommet 16, can be connected as a wire harness 17 directly to a connector 8c (see FIG. 4) of the meter 8 as shown in FIG. 6. Therefore, the instrument panel-side wire harness (including the connector 31 for connecting the engine room-side wire harness 15), used in the construction of FIG. 13, is not necessary, so that the number of the wire harnesses can be reduced. Since the use of the connector 31 is not necessary, the number of connections between the parts is reduced as compared with the related-art construction, so that the reliability is enhanced.

Figure 7:
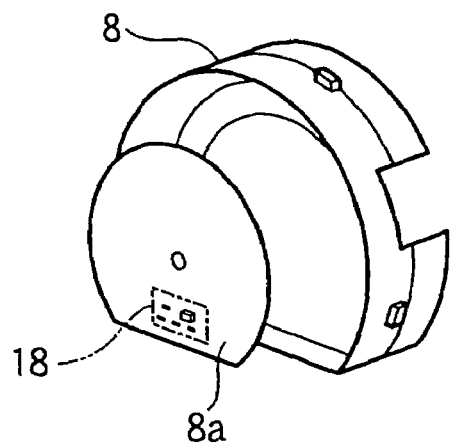
FIG. 7 is a perspective view showing one example of a meter board having an extended-function circuit mounted thereon.

A cross coil, a meter circuit and so on of the meter 8 are mounted on the meter board 8a shown in FIG. 4, and an extended-function circuit 18, having other function than the meter function, is also mounted on this meter board, as shown in FIG. 7.

Figure 8:
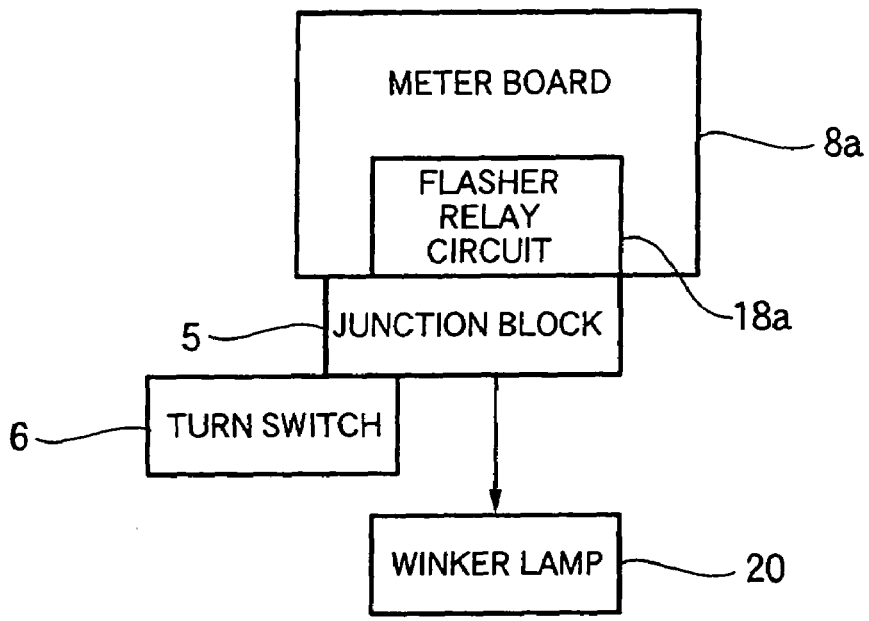
FIG. 8 is a diagram explanatory of a condition of connection of one example of the extended-function circuit of FIG. 7.

This extended-function circuit 18 is, for example, a flasher relay circuit 18a which operates winker lamps 20 and so on, as shown in FIG. 8. In a related-art construction, since a flasher relay unit is mounted alone on a junction block or at other place, it is necessary to use a special-purpose circuit board, and besides this flasher relay unit is provided at a place remote from a turn switch, so that a long wire harness for connecting the turn switch to the flasher relay is also required.

In this embodiment, the meter board 8a serves also as a flasher circuit board, so that the use of a separate flasher circuit board, provided in the related-art flasher relay unit, can be omitted. In addition, the turn switch 6 can be connected directly to the junction block 5, so that the use of the wire harness, heretofore required for connecting the turn switch 6 and the flasher relay together, can be omitted.

Therefore, the cost can be reduced by thus omitting the use of the separate flasher circuit board and the use of the wire harness connecting the turn switch and the flasher relay together.

Figure 9:
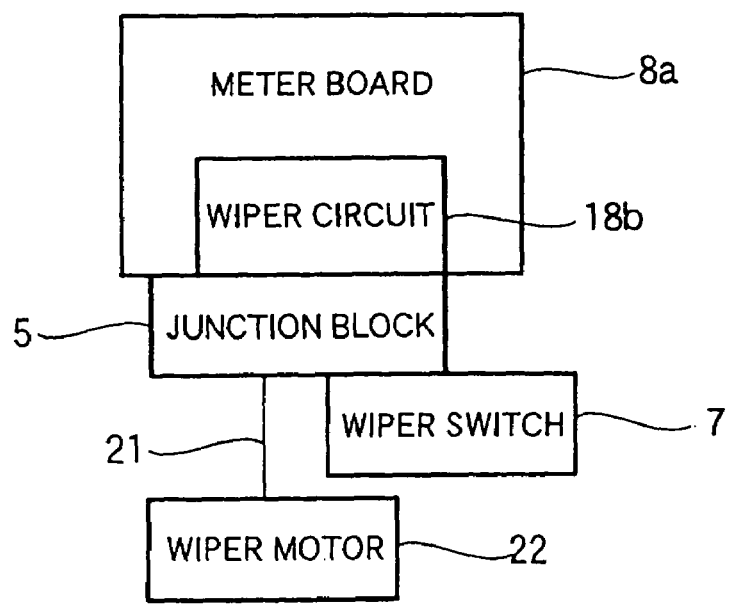
FIG. 9 is a diagram explanatory of a condition of connection of another example of the extended-function circuit of FIG. 7.

As shown in FIG. 9, the extended-function circuit 18 may be, for example, a wiper circuit 18b for intermittently driving wipers, instead of the flasher relay circuit 18a of FIG. 8. In a related-art construction, since a board, having a wiper circuit mounted thereon, is provided in a wiper switch, it is necessary to provide the separate board and an electronic circuit for intermittently driving the wiper.

As shown in FIG. 9, the meter board 8, having the meter circuit and the wiper circuit 18b mounted thereon, is connected directly to the junction block 5, so that the function of the wiper circuit 18b is effected through the junction block 5 when the wiper switch 7 is operated to intermittently drive a wiper motor 22 connected to the junction block 5 via a wire harness 21 so as to move wipers (not shown).

In this embodiment, since the meter board 8a thus serves also as the wiper circuit board, the use of the separate wiper circuit board can be omitted. And besides, since the wiper circuit 18a can be supplied with electric power from a power circuit of the meter circuit of the meter board 8a, the provision of an exclusive-use power circuit for the wiper circuit 18a is omitted. Furthermore, in the case where a CPU in the meter circuit is designed to perform the function of a control circuit or the like for the wiper circuit 18a, the use of this control circuit can be omitted.

Thus, the use of the wiper circuit board is omitted, and the meter circuit serves also to perform part of the functions of the wiper circuit, so that the number of the electronic parts and the costs can be reduced.

Figure 10:
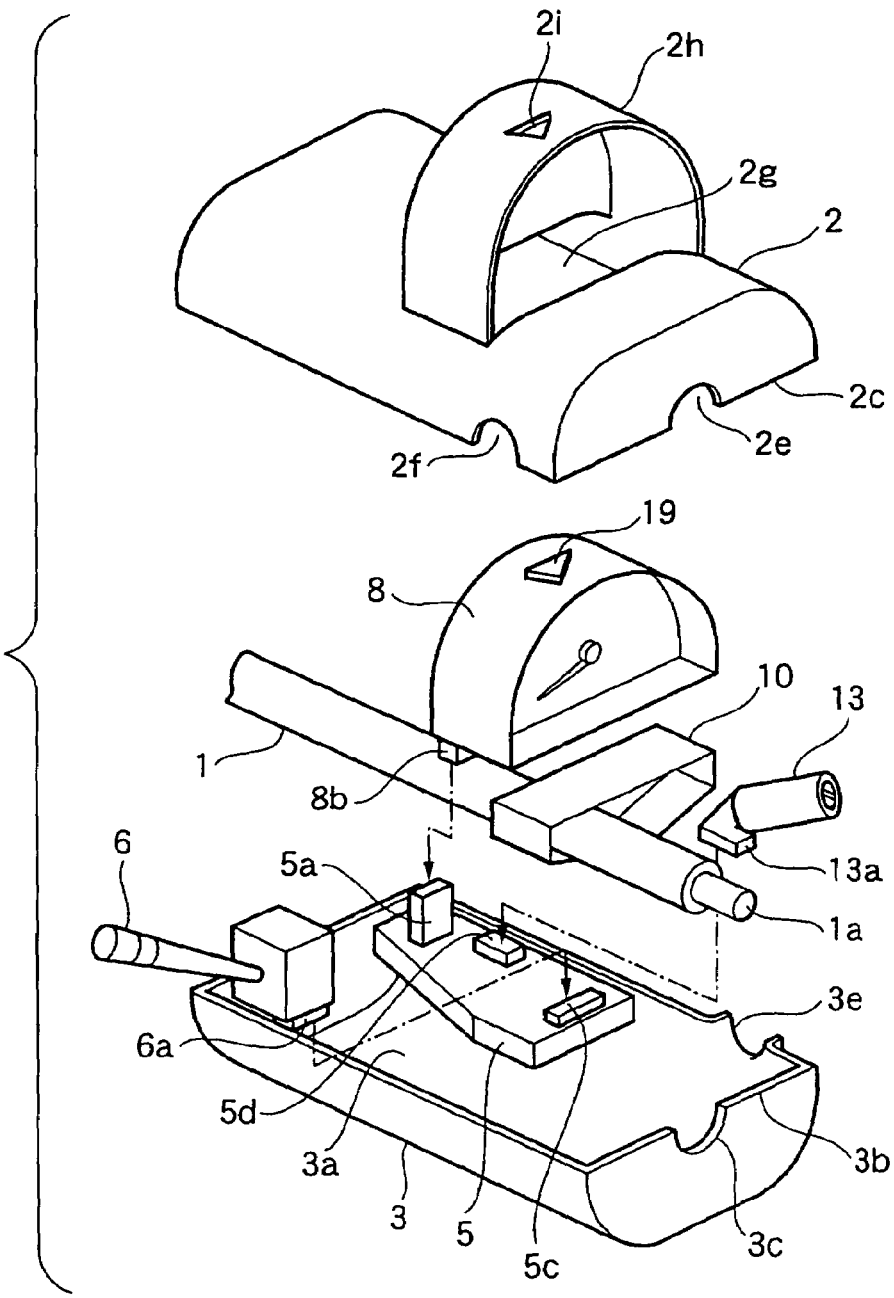
FIG. 10 is an exploded, perspective view of a steering column module according to a second embodiment of the invention.

FIG. 10 shows a steering column module according to a second embodiment of the invention. Those constituent elements, which are identical to those of the first embodiment, will be designated by identical reference numerals, respectively.

The steering column module comprises a steering column cover, composed of an upper column cover 2 and a lower column cover 3, a junction block 5, a meter 8, a turn switch 6, an ignition switch 13, and a hazard switch 19, and this steering column module is mounted on a steering post 1. A steering shaft 1a, on which a steering wheel 14 is mounted, is passed through the steering post 1, and a bracket 10 is fixedly secured to the steering post 1.

The upper column cover 2 has a receiving recess 2a formed by a lower edge portion 2c, and notches 2e and 2f, through which the steering shaft 1a and the turn switch 6 are respectively passed when this module is assembled, are formed in the lower edge portion 2c. A projected portion 2h is formed on an upper face of the upper column cover 2, and covers an upper portion of the meter 8 projecting through an opening 2g.

The lower column cover 3 has a receiving recess 3a formed by an outer edge portion 3b, and notches 3c and 3e, through which the steering shaft 1a and the ignition switch 13 are respectively passed when the module is assembled, are formed in the outer edge portion 3b.

The junction block 5 includes a connector 5a for connection to a connector 8b of the meter 8, a connector 5c for connection to a connector 6a of the turn switch 6, a connector 5d for connection to a connector 13a of the ignition switch 13, and a connector (which is not shown since it is disposed at the reverse side in FIG. 10) for connection to a wire harness from the exterior of the steering column module. The hazard switch 19 is mounted on the top of a cover of the meter 8.

For assembling the module, first, the connector 8b of the meter 8, the connector 6a of the turn switch 6 and the connector 13a of the ignition switch 13 are directly connected to the connectors 5a, 5c and 5d of the junction block 5, respectively. Then, the exterior wire harness is connected to the connector (not shown) of the junction block 5.

Then, the opening 2g is located in registry with the upper portion of the meter 8, and in this condition the upper column cover 2 is fitted on the meter 8, so that the upper portion of the meter 8 extends through the opening 2g, and is covered with the projected portion 2h, but the front side of the meter 8 is exposed. At this time, the hazard switch 19 is exposed through a hole 2i formed through the projected portion 2h. Then, the lower edge portion 2c of the upper column cover 2 and the outer edge portion 3b of the lower column cover 3 are coupled together, thus completing the steering column module. Incidentally, engagement grooves are formed in one of the lower edge portion 2c and the outer edge portion 3b while engagement claws are formed at the other as well as the first embodiment, so that the engagement claws are engaged in the engagement grooves, respectively.

Thus, the parts, provided at the steering column, that is, the switches 6, 7 and the meter 8, the junction block 5 and the steering post 1, can be incorporated into the steering column in a modularized manner.

Figure 11:
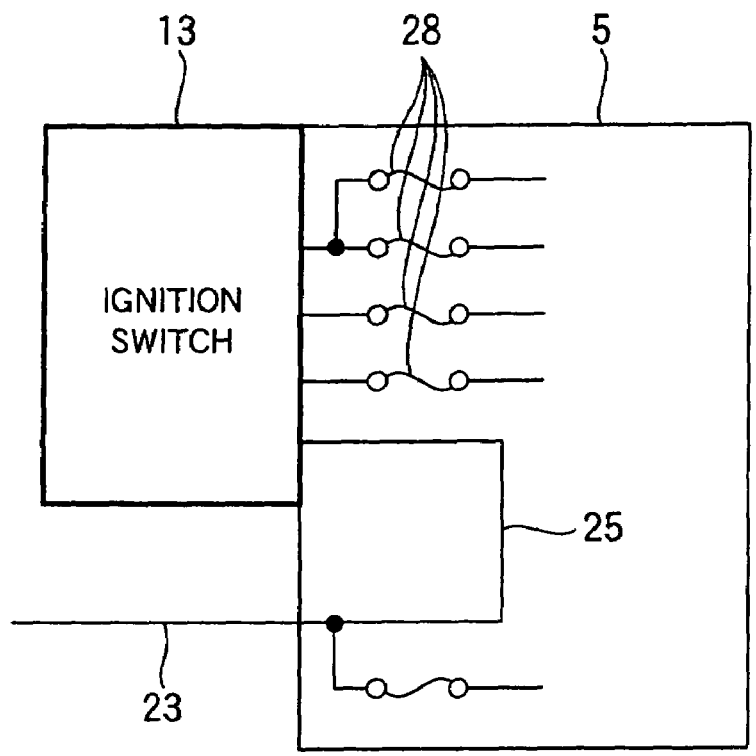
FIG. 11 is a diagram explanatory of a condition of direction connection between an ignition switch and a junction block of FIG. 10.
Figure 14:
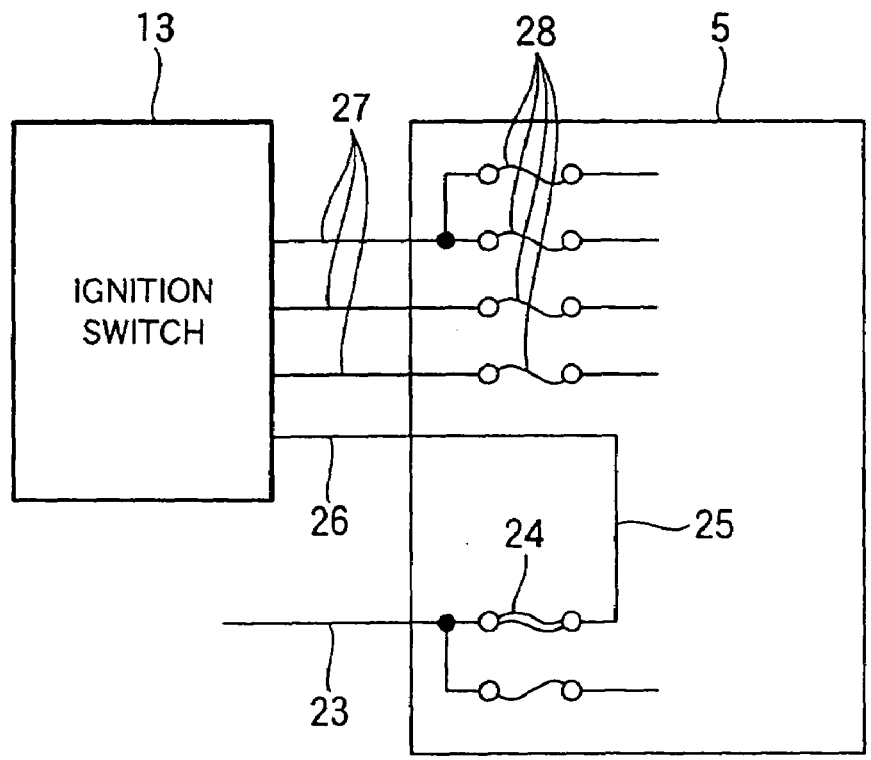
FIG. 14 is a diagram explanatory of a condition of connection between an ignition switch and the junction block in a third related-art construction.

The ignition switch 13 is connected directly to the junction block 5 as shown in FIG. 11, so that the use of the thick wire (for supplying the large current), connecting the ignition switch 13 and the junction block 5 together in the construction of FIG. 14, is omitted. Accordingly, the provision of the fusible link 24 for circuit protection purposes becomes unnecessary. Therefore, the cost of the junction block and the cost of the wire harness can be reduced.

Although the preferred embodiments of the present invention have been described, the invention is not limited to these embodiments, but various changes and modifications can be made.

For example, in the above embodiments, although the junction block 5 and the meter 8 are both incorporated in the modularized structure, either one of the junction block 5 and the meter 8 may be incorporated in the modularized structure.

In the above embodiments, the switches, such as the turn switch 6 and the wiper switch 7, are directly connected only to the junction block 5, but instead these switches may be directly connected respectively to connectors provided on the meter board 8a of the meter 8.

INDUSTRIAL APPLICABILITY

According to the above configurations, there is provided a steering column module in which the efficiency of an assembling operation around a steering column of a vehicle and the efficiency of an exchanging operation are improved, and besides the number of parts to be mounted, as well as the number of wire harnesses, can be reduced.

The invention claimed is:

1. A steering column module for a vehicle, comprising:
    a cover body;
    an electric junction block having a first connector and second connector, accommodated in the cover body;
    a meter having a third connector directly detachably connected to the first connector, and accommodated in the cover body; and
    at least one switch having a fourth connector directly detachably connected to the second connector,
    wherein the electric junction block, the at least one switch and the meter form a module that is removable from the cover body.

2. The steering column module as set forth in claim 1, wherein the at least one switch includes at least one of a turn switch, a wiper switch, a hazard switch and an ignition switch.

3. The steering column module as set forth in claim 1, further comprising a meter cluster accommodated in the cover body, wherein
    at least one of the electric junction block, the meter and the at least one switch is accommodated in the meter cluster to form a meter module.

4. The steering column module as set forth in claim 1, wherein the meter includes a circuit board on which a first circuit for driving the meter and a second circuit for driving the at least one switch is mounted.

5. The steering column module as set forth in claim 1, wherein the meter is directly connected to an engine room-side wire harness.

6. The steering column module as set forth in claim 1, wherein the meter is a combination meter.

* * * * *